UNITED STATES PATENT OFFICE.

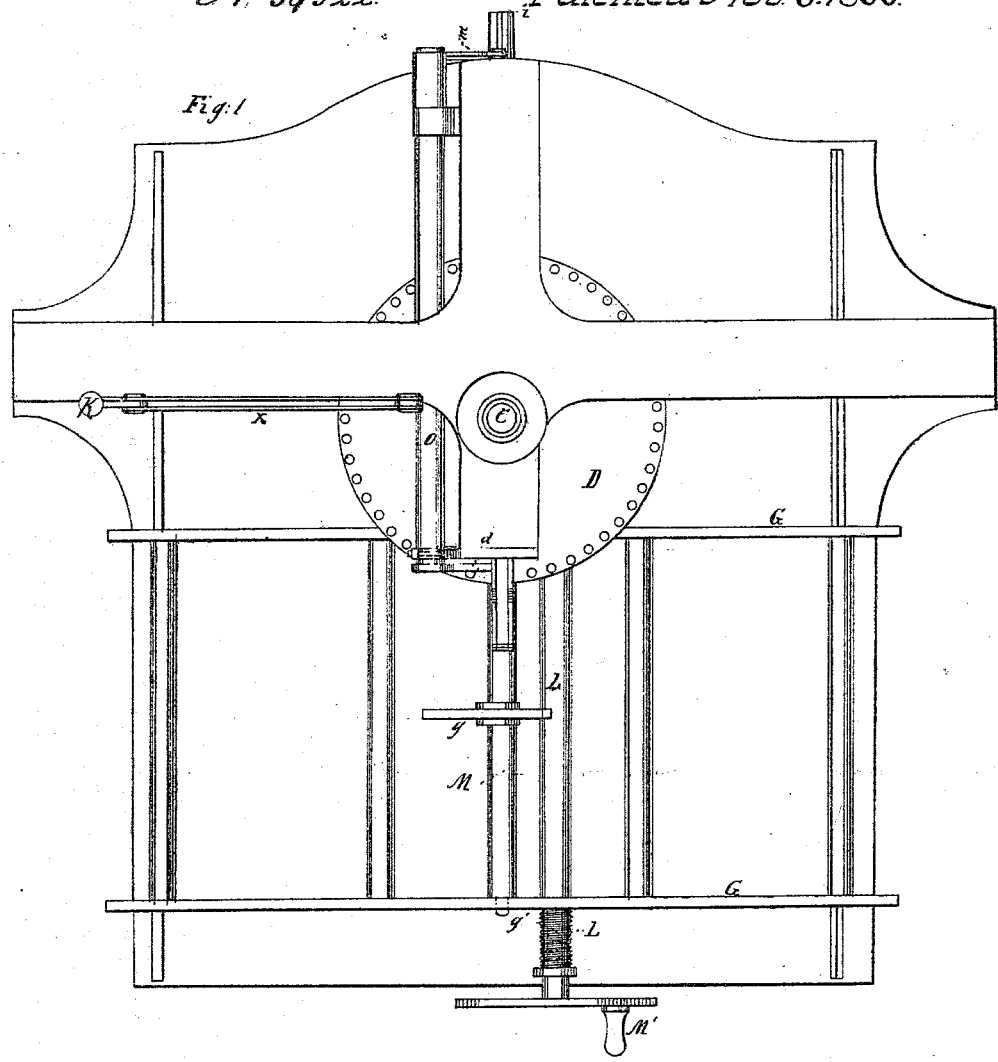

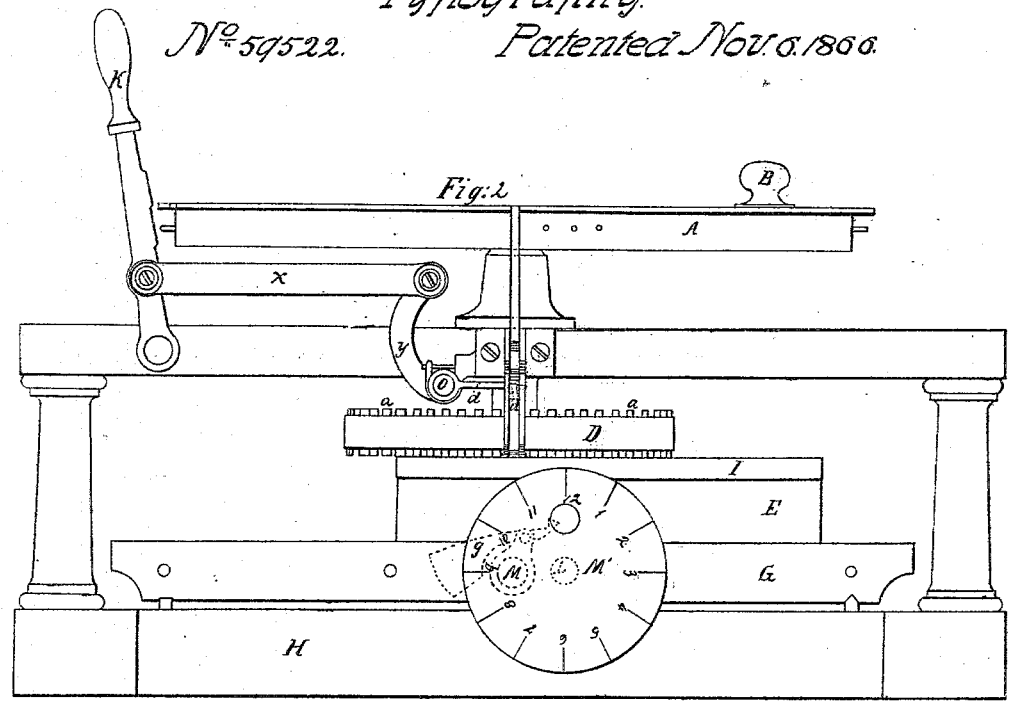
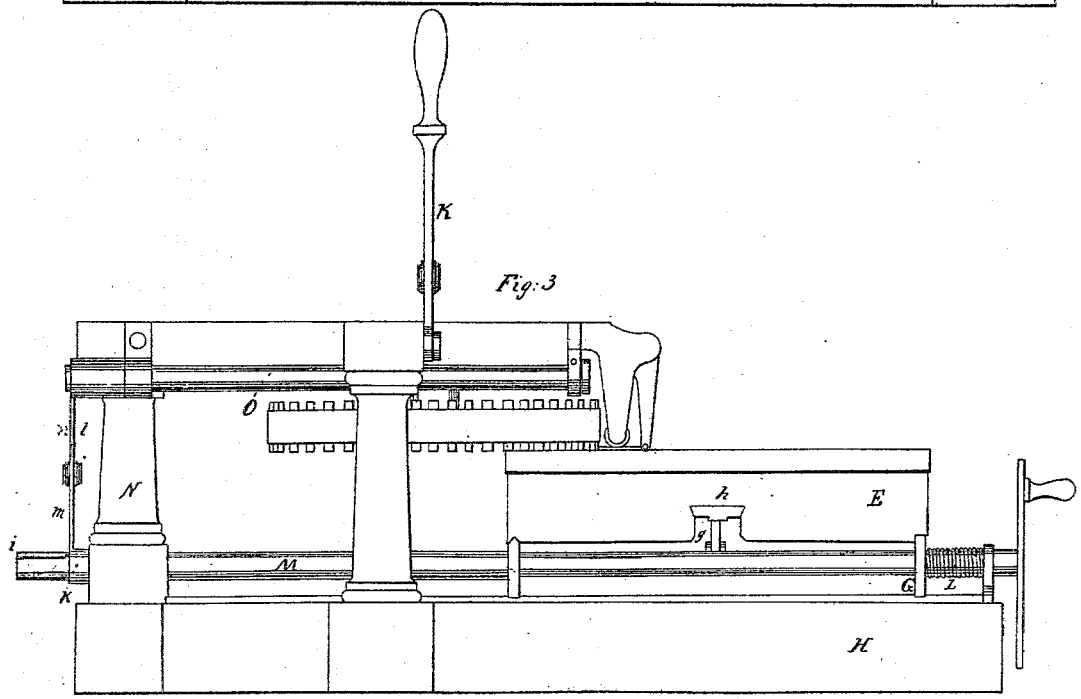

PIERRE FLAMM, OF PHLIN, FRANCE.

IMPROVEMENT IN TYPOGRAPHY.

Specification forming part of Letters Patent No. 59,522, dated November 6, 1866; patented in France, March 3, 1863.

*To all whom it may concern:*

Be it known that I, PIERRE FLAMM, a resident of Phlin, in the Empire of France, and a citizen of said Empire of France, have invented a new and useful Improvement in Typography, on which I have taken out Letters Patent for the Empire of France on the 3d day of March, 1863; and I do hereby declare that the following is a full and exact description thereof, so as to enable others skilled in the art to make and use my invention.

The nature of my invention consists in using an alphabet of types, which is set in a rotating or reciprocating frame in such a manner that each type can be sufficiently depressed to leave its impression upon a molding-block or form of soft material, and by imparting to said molding-block the proper reciprocating and advancing motion which is necessary to space the letters and for the formation of lines upon the mold, in this manner dispensing with the expensive stock of types and the distribution of the same after the form has been used.

A represents a disk on which the letters of the alphabet are marked. Near its circumference it can be turned by means of a knob, B. The disk A is secured upon the center shaft, C, on which another disk, D, is secured, which carries the letter-dies $a$, each representing one of the letters of the alphabet.

Below the disk A are two sliding frames, E G, one above the other. The frame E can slide longitudinally on the ways of the frame G, and the latter can slide laterally upon the ways of the base-plate H. The frame G is actuated by means of the screw-rod L, and can be adjusted longitudinally in any desired position.

On the under side of the frame E is a rack or ratchet, $h$, Figure 3, with which a pawl, $g$, engages. This pawl or dog is shown in plan in Fig. 1, and is mounted on a rod, M, (see Fig. 2,) one end of which is swiveled in the frame G at $g'$, and the other end projects through the standard N, being capable of sliding longitudinally in its bearing.

A longitudinal slot, $i$, is formed in the outer end of the rod, in which a spline on the interior of the sleeve $k$ fits. The sleeve $k$, which encircles the projecting end of the rod M, carries an arm, $m$, connected by a link-joint, $m'$, with a similar arm, $l$, attached to the shaft O, which is connected with the lever K by the link-pieces $x$ $y$. It will be seen that under this arrangement the pawl $g$ is made to actuate or move forward the frame E whenever the lever-handle K is pulled back, for this movement of the lever causes the partial rotation of the shaft O, which motion is communicated from the latter through the medium of the arms $l$ $m$ to the shaft or rod M, and to the pawl $g$, which is mounted upon it, causing the latter to move forward the frame E.

Thus the mold I, which consists of some soft material, can be moved laterally and longitudinally, and said movements can be adjusted with great accuracy for the proper formation of the spaces and lines.

In the operation of the machine the table A is turned so that the indicator $b$ comes opposite the letter to be printed. The lever K is then forced forward, whereby the hammer $d$, secured to the end of the shaft O, is made to strike the respective letter-die $a$, which leaves its impression upon the mold-block I. When the lever K is moved backward, the pawl $g$, Fig. 2, in the manner above explained, moves the mold I forward the length of the desired space to bring said block into position for the impression of the next following letter, and thus, by the consecutive impressions of the respective types, the line is formed in the mold. The line being finished, the operator turns the screw-shaft L by means of the crank M', and commences the next following line, and thus the operation is continued until the form is completed.

The crank M' consists of a circular disk or plate provided with a knob or handle placed eccentrically to the rod L. The disk is marked or divided off into equal parts, as shown in Fig. 2, and by this means the number of revolutions and fractional parts of revolutions of the screw-rod L necessary to separate one line the proper distance from the other can be readily and correctly ascertained.

A stereotype or electrotype cast may be made from the mold I, or any other process may be employed for producing the desired printing-surface from the form I.

The turning table A can be provided with the various denominations of types to be used in printing—i. e., with one alphabet of each.

The system above described may also be used with advantage in combination with electric telegraph apparatus for printing the messages.

Having thus fully described the nature of my invention, what I claim herein as new, and desire to secure by Letters Patent, is—

1. The combination of the mechanisms shown and described for impressing the type in the mold with those which regulate the transverse movement of such mold, so that they may be actuated or operated by the same lever or equivalent means, substantially as shown and set forth.

2. The combination of the mold and ratchet-frame E with the pawl which engages with such ratchet, mounted on a rock-shaft, as described, and operated substantially in the manner and for the purposes herein shown and set forth.

PIERRE FLAMM.

Witnesses:
F. COLLARD,
CH. BOURGON.